Nov. 7, 1939. G. SLAYTER 2,178,614
AIR FILTER
Original Filed April 10, 1933
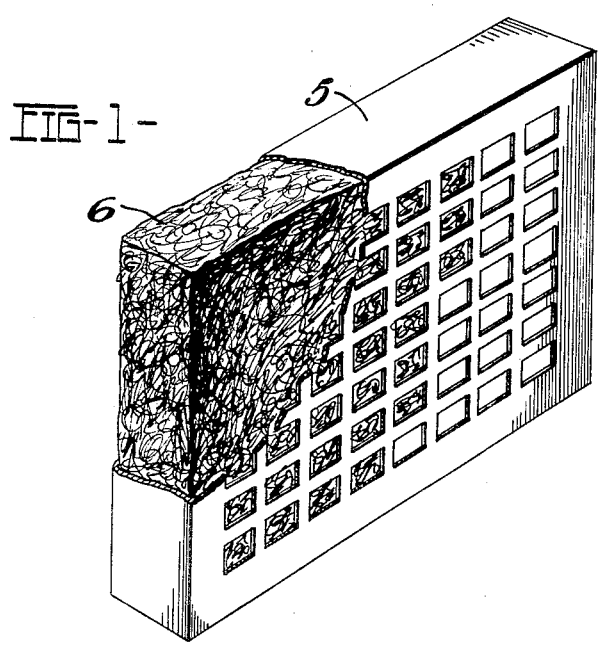
FIG-1-
FIG-2-
FIG-3-
Inventor
James Slayter
By J. F. Rule, Attorney Patented Nov. 7, 1939

2,178,614

UNITED STATES PATENT OFFICE 2,178,614

AIR FILTER

Games Slayter, Newark, Ohio, assignor, by mesne assignments, to Owens-Corning Fiberglas Corporation, a corporation of Delaware Application April 10, 1933, Serial No. 665,262
Renewed January 24, 1939

1 Claim. (Cl. 252—2.5)

My invention relates to filters and filtering materials for use in filtering air and other gases. More particularly, it relates to filtering material such as glass wool or other fibrous material, the fibers of which are coated with an adhesive substance such as a heavy oil or oily substance to which particles of dust and the like will readily adhere.

At the present day, air filters comprising fibrous materials treated with oil or other inflammable substances are used extensively. These filters which are readily combustible and which generate an intense heat during combustion are a serious fire hazard.

An object of my invention is to provide an air filter of the type indicated, in which the adhesive material is treated with a fireproofing agent. The latter is incorporated in the adhesive and thereby renders the filtering material incombustible.

A further object of the invention relates to the use of a foreign material combined with the adhesive to extend the surface areas of the filtering medium, thus increasing the efficiency and capacity of the filtering material. The foreign material may include a thickener or substance which will make the adhesive lumpy so that it forms irregularities or protuberances on the filter fibers in a manner to greatly increase the surface area. This results in a corresponding increase in the effectiveness and capacity of the filtering material.

A further object of the invention is to provide and combine with the filtering material, and particularly to incorporate in the adhesive, a sterilizing agent which is effective to kill germs, bacteria and mold life contained in the air which is being filtered or in the dust or other foreign material which is removed from the air by the filter.

Other objects of the invention will appear hereinafter.

In the accompanying drawing:

Fig. 1 is a perspective view of a filter unit, a portion of the outer casing or envelope being broken away.

Fig. 2 is a magnified view of an individual fiber of the filter material.

Fig. 3 is a view of a fiber which has been treated with a thickener or granular material by means of which enlargements or protuberances are formed on the surface of the fiber.

The filter unit, as shown, comprises an outer casing or envelope 5 enclosing the filtering material 6. This material may consist of glass wool or other fibrous material which has been treated as hereinafter set forth. Fibrous filtering materials such as are now extensively in use commercially are ordinarily treated with oil or an oily substance which provides an adhesive or sticky coating for the filter fibers or material, so that dust, etc., will readily adhere thereto.

In accordance with the present invention, the glass wool or other filter fibers are preferably treated with a heavy oil applied at a high temperature. The oil which is used has a low cold test and has been refined to remove all odor. To this oil has been added from 10% to 25% of wax. The glass wool or other filtering material treated in this manner provides a filter which is efficient throughout a wide range of temperatures without any running or dripping of the oil. The oil will not run off at a temperature of 125° F. and is sufficiently sticky or viscous to operate effectively as a dust catcher at temperatures of 20° F. or more below zero. Such oil or coating material retains its viscosity indefinitely within the range of temperatures given and in a medium of atmospheric air, and may be said to be permanently viscous under such conditions. Although glass wool is herein referred to as the filtering material or filter base, it is to be understood that a wide variety of fibrous or other materials are comprehended within the scope of my invention. These materials may include metals, as, for example, steel wool, and also organic substances, including both animal and vegetable fibers, etc.

In accordance with my invention, the adhesive with which the glass wool or the like is coated, may be treated with a fireproofing agent or material. This material is incorporated in the adhesive, thereby rendering the latter incombustible. If the filter fibers, as well as the adhesive coating, consist of a combustible material, as, for example, excelsior, the fireproofing agent will also render such material incombustible. I have found that diammonium phosphate provides a satisfactory and effective fireproofing agent. I have also found that calcium chloride gives good results as a fireproofing agent, rendering the adhesive or filtering material to which it is applied, substantially fireproof.

By the term "fireproof" as used in the present specification and claim is meant that the substance of material to which the term is applied, is such that although it may burn when a flame is applied thereto, the fire will go out and not be supported by the material when the external source of heat is removed. By the expression "fireproofing agent" is meant the substance or agent which renders the adhesive or filtering material fireproof. The filtering material may be said to be substantially fireproof when it will not burn or smolder progressively after the removal of an external source of ignition. As herein used, the term "fire resistant" is meant to define a material which can be burned, but with difficulty.

In order to increase the capacity and effectiveness of the filtering material, the adhesive which is applied to the filter fibers may have added thereto a foreign material such, for example, as gypsum, borax or sodium silicate by which the surfaces of the filter fibers are extended or enlarged. The material which is thus added to increase or extend the filter surfaces may or may not be a fireproofing agent. The fireproofing agent may, if desired, be separately added to the adhesive material in addition to the said material for extending the filter surfaces.

In accordance with my invention, a material may be added to the adhesive which serves as a thickener and makes the adhesive lumpy, so that lumps or irregular projections are formed on the filter fibers. I have found that zinc soap makes a good thickener for this purpose. Zinc stearate is an example of such a soap. It may be applied to the filter body while hot and in a liquid condition as it does not dissolve readily without being heated, and I have found that when it cools it has a tendency to "lump out" and produces lumps and irregularities on the fibers or filter body. A fibrous or granular material when added to the adhesive is also effective for increasing the filtering surface and producing the irregularities above referred to.

In Fig. 2, I have shown a fiber 7 of the filtering material having a comparatively smooth surface. In Fig. 3, a fiber is shown which has been treated with a thickener which renders the adhesive lumpy and produces irregularities 8 on the surface of the filter fiber in the form of nodes, nodules, lumps, protuberances, or projections. These materially increase the filtering surface areas and assist in catching dust or the like from the air passing through the filter. It will be understood that the thickener or other material which is added to the adhesive to extend the filter surfaces or to render said surfaces irregular or lumpy may be used either in combination with a fireproofing agent or independently thereof.

The present invention also comprehends the use of a sterilizing agent applied to or incorporated with the adhesive material. The sterilizing agent may be a chemical such, for example, as mercuric chloride which is toxic to germs, mold and bacteria. This sterilizing agent may be used in addition to, or in combination with, the fireproofing and thickening materials, or either one of them, or independently thereof, depending on the specific results desired. It is preferably mixed with the adhesive before the latter is applied to the wool or other filter base. Such sterilizing agent is effective in removing germ life from the air or gas which is being filtered and also in preventing such germ life from finding lodgment and propagating within the filter or on the filtering medium.

Modifications may be resorted to within the spirit and scope of my invention.

What I claim is:

An air filter comprising a porous base of fibrous material, a viscous coating for said material comprising an oil, and a zinc soap mixed with the oil by which the dust-catching surfaces of the filter are greatly extended and made irregular and by which the oil is thickened, said coating having a consistency which prevents it from flowing at atmospheric temperatures.

GAMES SLAYTER.